(12) United States Patent
Tanno et al.

(10) Patent No.: US 9,481,600 B2
(45) Date of Patent: Nov. 1, 2016

(54) OPTICAL GLASS, GLASS MATERIAL FOR PRESS MOLDING, OPTICAL ELEMENT, METHOD FOR PRODUCING GLASS MATERIAL FOR PRESS MOLDING, AND METHOD FOR PRODUCING OPTICAL ELEMENT

(71) Applicant: HOYA CORPORATION, Tokyo (JP)

(72) Inventors: Yoshitake Tanno, Akishima (JP); Yuki Shiota, Akishima (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 14/414,249

(22) PCT Filed: Jul. 18, 2013

(86) PCT No.: PCT/JP2013/069533
§ 371 (c)(1),
(2) Date: Jan. 12, 2015

(87) PCT Pub. No.: WO2014/014060
PCT Pub. Date: Jan. 23, 2014

(65) Prior Publication Data
US 2015/0183682 A1    Jul. 2, 2015

(30) Foreign Application Priority Data

Jul. 18, 2012  (JP) ................... 2012-159886
Oct. 9, 2012  (JP) ................... 2012-224439

(51) Int. Cl.
*C03C 3/247* (2006.01)
*G02B 1/02* (2006.01)

(52) U.S. Cl.
CPC ............. *C03C 3/247* (2013.01); *G02B 1/02* (2013.01)

(58) Field of Classification Search
CPC .................... C03C 3/247; G02B 1/02
See application file for complete search history.

(56) References Cited

U.S. PATENT DOCUMENTS

| | | | |
|---|---|---|---|
| 2007/0027017 A1* | 2/2007 | Hachitani | C03C 3/247 501/47 |
| 2008/0132400 A1 | 6/2008 | Hachitani | |
| 2009/0298668 A1* | 12/2009 | Ikenishi | G02B 1/02 501/44 |
| 2012/0245015 A1 | 9/2012 | Ikenishi | |

FOREIGN PATENT DOCUMENTS

| | | |
|---|---|---|
| JP | 2003-160356 A | 6/2003 |
| JP | 2008-137877 A | 6/2008 |
| JP | 2009-203114 A | 9/2009 |
| JP | 2009-286670 A | 12/2009 |
| JP | 2012-001422 A | 1/2012 |
| JP | 2012-012282 A | 1/2012 |
| JP | 2012-126603 A | 7/2012 |

OTHER PUBLICATIONS

Machine Translation of JP 2012-001422 A, Jan. 5, 2012.*
Machine Translation of JP 2003-160356 A, Jun. 3, 2003.*
Machine Translation of JP 2012-012282 A, Jan. 19, 2012.*
Oct. 15, 2013 International Search Report issued in International Patent Application No. PCT/JP2013/069533.
Jan. 20, 2015 International Preliminary Report on Patentability issued in International Patent Application No. PCT/JP2013/069533.

* cited by examiner

*Primary Examiner* — Elizabeth A Bolden
(74) *Attorney, Agent, or Firm* — Oliff PLC

(57) ABSTRACT

Provided are an optical fluorophosphate glass having excellent optical characteristics and also excellent processability, a glass material for press molding and an optical element each including the glass, and methods for producing the glass material and the optical element. The optical glass includes $P^{5+}$ as a cationic component and $O^{2-}$ and $F^-$ as anionic components, wherein the optical glass has a content of $F^-$ of 40 anionic % or less, an abrasion factor $F_A$ of 420 or higher, and a fragility index value B of 4500 $\mu m^{-1/2}$ or lower.

16 Claims, 2 Drawing Sheets

OPTICAL GLASS, GLASS MATERIAL FOR PRESS MOLDING, OPTICAL ELEMENT, METHOD FOR PRODUCING GLASS MATERIAL FOR PRESS MOLDING, AND METHOD FOR PRODUCING OPTICAL ELEMENT

CROSS-REFERENCE TO RELATED APPLICATIONS

This application is a continuation of International Application No. PCT/JP2013/069533 filed on Jul. 18, 2013, which claims priority to Japanese Patent Application Nos. JP 2012-159886 and JP 2012-224439. The contents of the prior Applications are herein incorporated by references in their entireties.

TECHNICAL FIELD

The present invention relates to an optical glass, a glass material for press molding, an optical element, and methods for producing the glass material and the optical element. Specifically, the present invention relates to an optical fluorophosphate glass having excellent optical characteristics and also excellent processability, a glass material for press molding and an optical element comprising the glass, and methods for producing the glass material and the optical element.

BACKGROUND ART

Fluorophosphate glass, which contains $P^{5+}$ as a cationic component and $O^{2-}$ and $F^-$ as anionic components, has low dispersion characteristics and also anomalous partial dispersion characteristics, and hence is known as an optical glass having an excellent chromatic aberration correction function. Examples of such glass are disclosed in Patent Literatures 1 and 2.

Production of an optical element by using the optical glass described in any of Patent Literatures 1 to 3 may involve a step of grinding or polishing the glass. Examples of the production include a case of preparing a lens from a glass material through steps of coarse grinding, fine grinding, polishing, and the like, a case of subjecting a ions prepared by precision press molding to a grinding process called centering, a case of processing a glass material for press molding which is called a preform and which is used for precision press molding, and other cases.

Arsons fluorophosphate glasses, the glass described in Patent Literature 1 is a glass in the region with a high refractive index and a low dispersion, where the fluorine content is relatively low (the $F^-$ content is lower than 40 anionic %). This glass has anomalous partial dispersion characteristics and high refractive index characteristics and serves as a lens material which is extremely effective for function improvement and size reduction of optical systems. However, this glass has such a problem that, during a grinding process, the glass is easily broken due to cracks formed in the surface being ground.

CITATION LIST

Patent Literatures

Patent Literature 1: Japanese Patent Application Publication No. 2012-12282
Patent Literature 2: Japanese Patent Application Publication No. 2009-286670
Patent Literature 3: Japanese Patent Application Publication No. 2008-203114

SUMMARY OF INVENTION

Technical Problems

The present invention has been made to solve the above-described problem characteristic of fluorophosphate glass with a low fluorine content, and an object of the present invention is to provide an optical fluorophosphate glass having excellent optical characteristics and also excellent processability, a glass material for press molding and an optical element comprising the glass, and methods for producing the glass material and the optical element.

Solution to Problems

The present invention provides the following:

(1) An optical glass comprising $P^{5+}$ as a cat ionic component and $O^{2-}$ and $F^-$ as anionic components, wherein
the optical glass has a content of $F^-$ of 40 anionic % or less, an abrasion factor $F_A$ of 420 or higher, and a fragility index value 8 of 4000 $\mu m^{-1/2}$ or lower.

Advantageous Effects or Invention

The present invention makes it possible to provide an optical fluorophosphate glass having excellent optical characteristics and also excellent processability, a glass material for press molding and an optical element comprising the glass, and methods for producing the glass material and the optical element.

DESCRIPTION OF EMBODIMENTS

The present inventors have studied the problem of the processability characteristic of optical fluorophosphate glass in a region with low fluorine content (on the low-fluorine content side), among optical fluorophosphate glasses, and consequently acquired the following knowledge.

Figure 1:
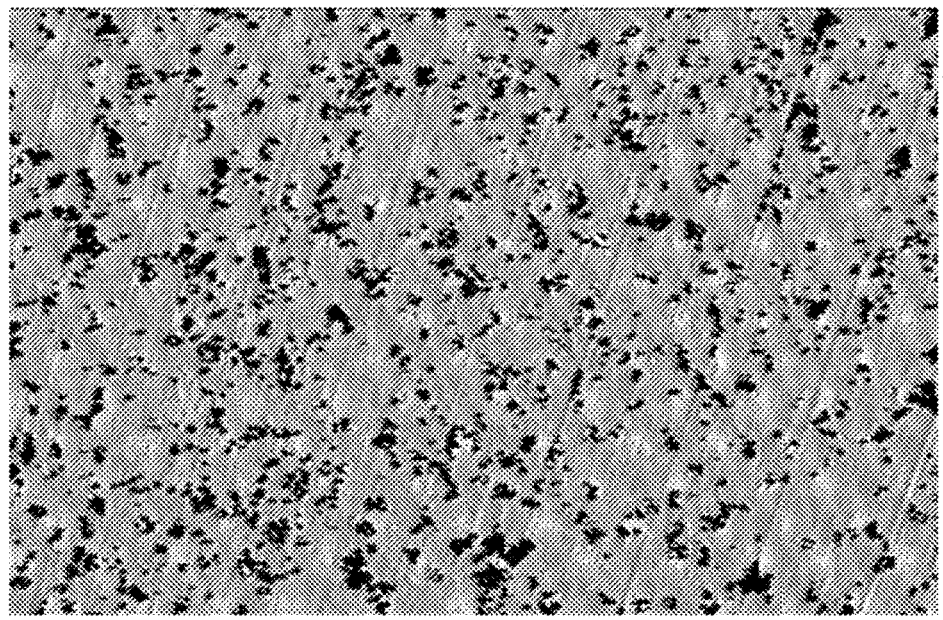
FIG. 1 is an image obtained by measuring irregularities on a CG-processed surface of glass A with a non-contact surface profiler, and converting the irregularities into brightness and darkness (measurement area: 0.35 mm×0.27 mm).
Figure 2:
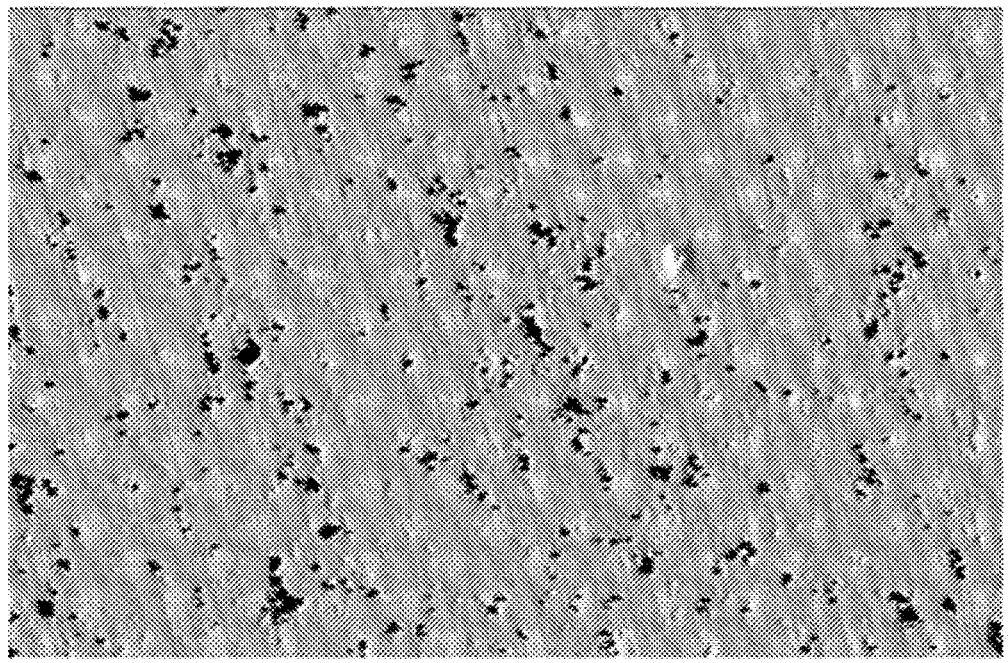
FIG. 2 is an image obtained by measuring irregularities on a CG-processed surface of glass B with a non-contact surface profiler, and converting the irregularities into brightness and darkness (measurement area: 0.35 mm×0.27 mm).
Figure 3:
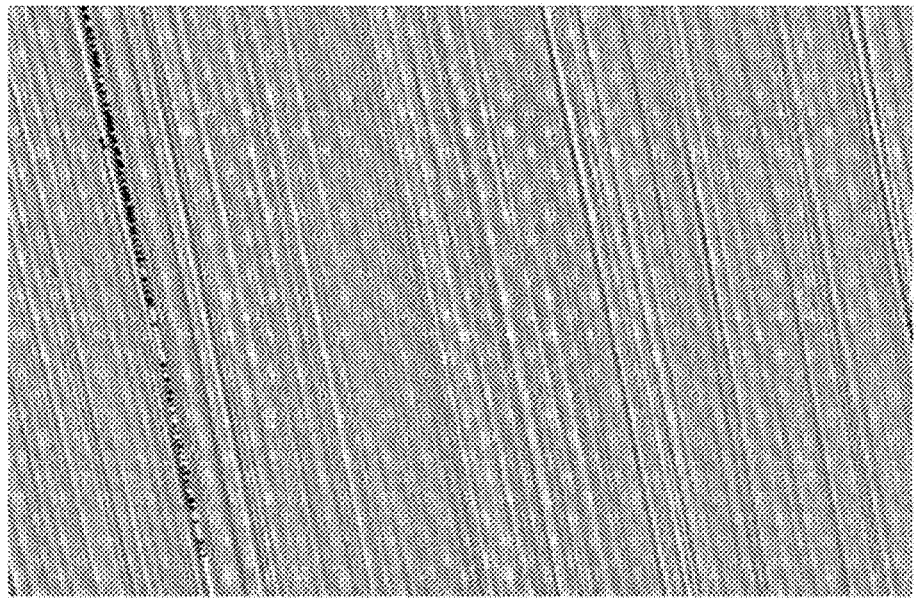
FIG. 3 is an image obtained by measuring irregularities on a CG-processed surface of glass C with a non-contact surface profiler, and converting the irregularities into brightness and darkness (measurement area: 0.35 mm×0.27 mm).

An optical fluorophosphate glass on the low-fluorine content side is susceptible to breakage daring a grinding process using a curve generator (CG) than a fluorophosphate glass with a high fluorine content ion the high fluorine content side). FIG. 1 shows an image obtained by measuring irregularities on a CG-processed surface of a commerciality available glass (glass A) on the low-fluorine content side with, a non-contact surface profiler (a non-contact surface profiler, New-View, manufactured by Zygo), and converting the irregularities into brightness and darkness. FIG. 2 also shows an image obtained by measuring irregularities on a CG-processed surface of a commercially available glass (glass B) on the low-fluorine content side with a non-contact surface profiler, and converting the irregularities into brightness and darkness in the same manner. FIG. 3 is an image obtained by measuring irregularities on a CG-processed surface of a glass (glass C, with an F$^-$ content of 90.82 anionic %) on the high fluorine content side described in Example 43 of Patent Literature 3 with a non-contact surface profiler, and converting the irregularities into brightness and darkness in the same manner. In the images, the bright portions correspond to raised portions, and dark portions correspond to recessed portions. The measurement areas were each 0.35 mm×0.27 mm. On the ground surface shown in FIG. 3, the glass is ground in one direction by the grinding. In contrast, on the ground surface shown in FIG. 1, many dents are formed in a black dot pattern, indicating that the glass is pulled out by the grinding. On the ground surface shown in FIG. 2, dents in a black dot pattern are observed, although the dents are less severe than those in FIG. 1. As described above, glass A has poorer processability than glass C. Although glass B has better processability than glass A, it cannot be said that glass B has sufficient processability in comparison with glass C.

The good or poor processability can be understood as the following phenomenon.

In grinding, glass susceptible to abrasion is resistant to breakage, because the glass is ground before a large force is applied with a grindstone. Meanwhile, glass with low brittleness is resistant to breakage, even when a large force is applied with a grindstone. On the other hand, glass which is resistant to abrasion and has high brittleness is easily broken during grinding, because a large force is applied to the brittle glass.

The susceptibility of glass to abrasion can be quantified using the abrasion factor $F_A$. Meanwhile, the index of the brittleness can foe quantified using fragility index value B.

[Abrasion Factor $F_A$]

The abrasion factor $F_A$ is determined as follows. A glass sample with a measurement area of 9 cm$^2$ is hold at a predetermined position 80 nm away from the center of a cast iron flat plate rotating horizontally at 60 rpm. While a lapping liquid obtained by adding 20 ml of water to 10 g of alumina abrasive grains with an average particle diameter of 20 μm is supplied uniformly for 5 minutes, the glass sample is lapped with a load of 9.807 N being applied. The mass of the sample is weighed before and after the lapping, and the abrasion mass m is found. In the same manner, the abrasion mass $m_0$ of a standard sample (BSC7) specified by Japan Optical Glass Manufacturers' Association is measured, and the abrasion factor $F_A$ is calculated by the following formula.

$F_A=[(m/d)/m_0/d_0)]\times 100$

Here, d is the specific gravity of the glass measured, and $d_0$ is the specific gravity of the standard sample. The specific gravity is measured by Archimedes' method.

[Fragility Index Value B]

The fragility index value B is defined using the Vickers hardness Hv and the fracture toughness value Kc of glass by the following formula.

$B=Hv/Kc$

Specifically, the fragility index value B is determined as follows. By using a Vickers hardness tester, a Vickers indenter is impressed into a polished surface of glass with a load P. The diagonal line length of an impression formed by impressing the Vickers indenter is denoted by a. The length of a crack formed from a corner of the impression is denoted by C. Note that, the procedures from the impression with the Vickers indenter to the measurement of the diagonal line length a of the impression and the crack length C are conducted with the glass sample being placed in the air at a temperature of 22.5° C.±0.5° C. and a relative humidity of 63%±1%. When the Young's modulus of the glass is denoted by E, the Vickers hardness Hv and the fracture toughness value Kc are determined by the following formulae:

$Hv=1.8544\times[P/(2a)^2]$, and $Kc=0.026\times(E^{1/2}\times p^{1/2}\times a^{3/2})$, respectively.

From these formulae, $B=1.7831\times[(P\times C^3)/(a^2\times E)]^{1/2}$.

Figure 4:
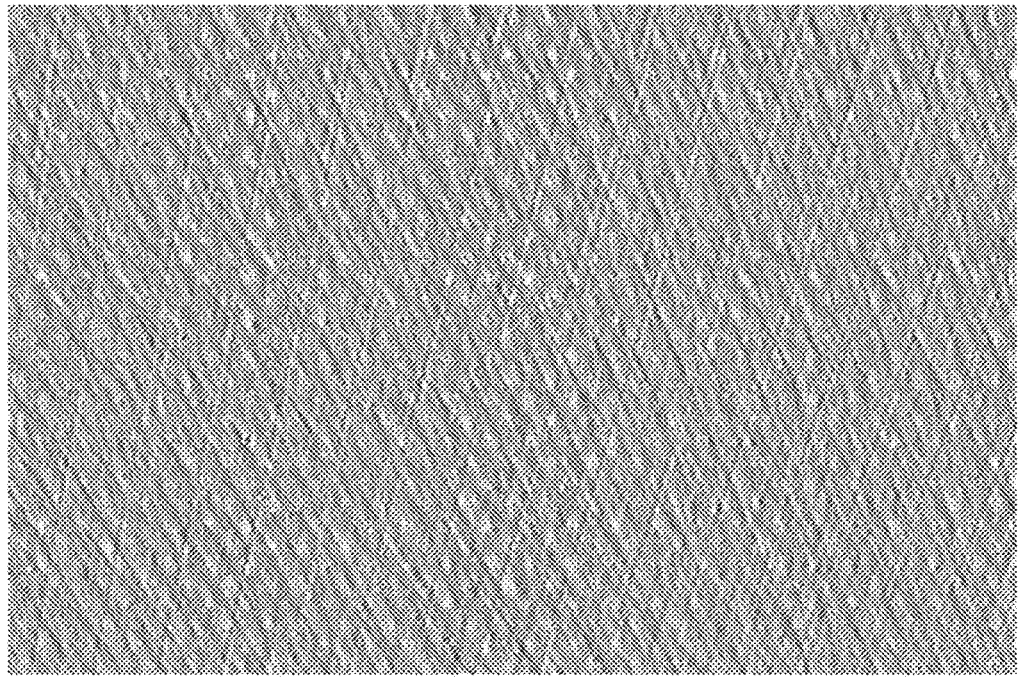
FIG. 4 is an image obtained by measuring irregularities on a CG-processed surface of glass E with a non-contact surface profiler, and converting the irregularities into brightness and darkness (measurement area: 0.35 mm×0.27 mm).

In addition to glasses A to C, a commercially available glass D (FCD1 manufactured by HOYA) and glass E (F$^-$ content: 25.4 anionic %) which corresponded to an example of the present invention were CG-processed, and the shape of irregularities on each of the processed surfaces was measured with a non-contact surface profiler. On the processed surface of the glass D, the glass is ground in one direction, and no dents in a black dot pattern are observed, as in the case of glass C. FIG. 4 shows an image obtained, by converting the irregularities on the processed surface of the glass E into brightness and darkness. On the surface of the glass E, no dents in a black dot pattern are observed. Note that the measurement area in FIG. 4 is equal, to the measurement area of each of FIGS. 1 to 3.

Next, the abrasion factor $F_A$ and the fragility index value B of each of the glasses A to E were measured. The glass A had an abrasion factor $F_A$ of 460 and a fragility index value B exceeding 4000 μm$^{-1/2}$. The glass B had an abrasion factor $F_A$ of 460 and a fragility index value B exceeding 4000 μm$^{-1/2}$. The glass C had an abrasion factor $F_A$ of 400 and a fragility index value B of 3121 μm$^{-1/2}$. The glass D had an abrasion factor $F_A$ of 410 and a fragility index value B of 3367 μm$^{-1/2}$. The glass E had an abrasion factor $F_A$ of 480 and a fragility index value E of 3307 μm$^{-1/2}$.

Based on the above-described shapes of the irregularities on the processed surfaces at the CG processing, the glasses C, D, and E are better in processability than the glasses A and B.

In general, processing glass with a greater abrasion factor results in poor finish quality, because flaws are easily formed during the processing. Conventional glasses on the low-fluorine Content side also have large abrasion factors. However, the abrasion factor is an index of the processing speed resulting from the overall mechanical properties such as hardness, chemical durability such as water resistance, and the like of the glass. Hence, the present inventors assumed that the phenomenon in which glass is pulled out by the CG-processed cannot be explained simply by the large abrasion factor.

In this respect, the present inventors have found that, by lowering the fragility index value B, an optical fluorophosphate glass having an abrasion factor $F_A$ of 420 or higher can be prevented from being broken during processing.

A grinding processing test was conducted by using glasses which had abrasion factors $F_A$ of 420 or higher and were accordingly easily ground and which had different fragility index values. This test has shown that a glass excellent in processability can be obtained when the fragility index value B is set to 4000 $\mu m^{-1/2}$ or lower.

To obtain anomalous partial dispersion characteristics and high refractive index characteristic, the content of $F^-$ is made 40 anionic % or less. It is effective to impart an abrasion factor $F_A$ of 420 or higher to a glass on the low fluorine side, because of an effect of suppressing the breakage of the glass during processing, and also in view of maintaining properties of the glass, such as thermal stability and refractive index.

As described above, even when a fluorophosphate glass having a content of $F^-$ of 40 anionic % or less has an abrasion factor $F_A$ of 420 or higher, the processability, especially processability in a grinding process of the glass can be improved by setting the fragility index value B to 4000 $\mu m^{-1/2}$ or lower, because breakage such as chipping and cracking of the glass due to abrupt application of a large load to the glass during the processing or due to a load on the glass generated by irregularities on a surface of a processing tool is suppressed.

Hereinafter, embodiments of the present invention are described,

[Optical Glass]

An optical glass of the present invention has a fluorophosphate-based glass composition containing $P^{5+}$ as a carbonic component and $O^{2-}$ and $F^-$ as anionic components to obtain a low-dispersion optical glass with positive anomalous partial dispersion characteristics. In a fluorophosphate glass, the refractive index tends to decrease with the increase in the content of $F^-$. Hence, the content of $F^-$ is made 40 anionic % or less to achieve a high refractive index. Besides, to improve the processability of the glass, the optical glass has an abrasion factor $F_A$ of 420 or higher and a fragility index value B of 4000 $\mu m^{-1/2}$ or lower.

Moreover, from the viewpoints of maintaining thermal stability, high refractive index, and large anomalous partial dispersion characteristics, a preferred lower limit of the abrasion factor FA is 430, a more preferred lower limit is 440, a still more preferred lower limit is 450, an even more preferred lower limit is 460, and a yet more preferred lower limit is 470, whereas a preferred upper limit of the abrasion factor $F_A$ is 520, a more preferred upper limit is 510, an even more preferred upper limit is 500, and a yet more preferred upper limit is 490.

In view of more reliably preventing breakage during a grinding process, the fragility index value B is preferably 3950 $\mu m^{-1/2}$ or lower, more preferably 3900 $\mu m^{-1/2}$ or lower, and still more preferably 3850 $\mu m^{-1/2}$ or lower.

[Composition of Glass]

In the following description, the content of each cationic component and the total content of cat ionic components are expressed in cationic %, unless otherwise noted, and the content of each anionic component and the total content of anionic components are expressed in anionic %, unless otherwise noted.

Note that the cationic % herein represents the number of cations of interest/the total number of cations of glass components×100. Meanwhile, the anionic % represents the number of anions of interest/the total number of anions of glass components×100.

A preferred mode of the optical glass of the present invention is an optical glass comprising $P^{5+}$, $Al^{3+}$, alkali metal ions, and alkaline earth metal ions as cationic components, wherein the content of $P^{5+}$ is 20 to 45 cationic %,
the content of $Al^{3+}$ is 10 to 30 cationic %,
the total content $R^+$ of the alkali metal ions exceeds 0 cationic % and is 12 cationic % or less,
the total content $R^{2+}$ of the alkaline earth metal ions is 20 cationic % or more.
the content of $Rb^+$ is 0 to 3 cationic %, and
the content of $Cs^+$ is 0 to 3 cationic %.

$P^{5+}$ is a component which forms the glass network. To maintain favorable thermal stability, the content of $P^{5+}$ is preferably 20 cationic % or more. To maintain a favorable chemical durability, and to maintain low dispersion characteristics and anomalous partial dispersion characteristics, the content of is preferably 45 cationic % or less. From the above-described viewpoints, a more preferred lower limit of the content of $P^{5+}$ is 22 cationic %, a still more preferred lower limit is 25 cationic %, an even more preferred lower limit is 28 cationic %, and a yet more preferred lower limit is 30 cationic %, whereas a more preferred upper limit of the content of $P^{5+}$ is 43 cationic %, a still more preferred upper limit is 42 cationic %, and an even more preferred upper limit is 40 cationic %. A yet more preferred upper limit is 39 cationic %.

(Alkali Metal Components)

The alkali metal components are cationic components which have functions to adjust the viscosity of the glass, improve the thermal stability thereof, and lower the fragility index value. To achieve the above-described effects, the total content FT of the alkali metal ions preferably exceeds 0 cationic %. On the other hand, when the total content $R^+$ of the alkali metal, ions is excessive, the thermal stability decreases. Hence, the total content $R^+$ of the alkali metal ions is preferably 12 cationic % or less.

A more preferred lower limit of the total content $R^+$ of the alkali metal ions is 0.5 cationic %, a still more preferred lower limit is 1 cationic %, an even more preferred lower limit is 2 cationic %, and a yet more preferred lower limit is 3 cationic %, whereas a more preferred upper limit of the total content $R^+$ of the alkali metal ions is 9 cationic %, a still more preferred upper limit is 8 cationic %, and an even more preferred upper limit is 6 cationic %.

The alkali metal components include $Li^+$, $Na^+$, $K^+$, $Rb^+$, and $Cs^+$. Alkali metal components with small ion radii, i.e., with smaller atomic numbers are effective for lowering the fragility index value B. Accordingly, the mole ratio (($Li^+$+$Ba^+$+$K^+$)/$R^+$) of the total content of $Li^+$, $Na^+$, and $K^+$ to the total content $R^+$ of the alkali metal ions is preferably 0.8 to 1, more preferably 0.85 to 1, further preferably 0.9 to 1, still further preferably 0.95 to 1, yet further preferably 0.99 to 1, and even more preferably 1.

For lowering the fragility index value B, the mole ratio ($Li^+$/$R^+$) of the content of $Li^+$ to the total content $R^+$ of the alkali metal ions preferably exceeds 0, and is more preferably 0.1 or more, further preferably 0.3 or higher, still further preferably 0.5 or higher, yet further preferably 0.7 or higher, still more preferably 0.8 or higher, yet more preferably 0.9 or higher, and particularly more preferably 1.

A still mere preferred range for lowering the fragility index value B is such that the mole ratio ($Li^+$/$Li^+$+$Na^+$+$K^+$)) of the content of $Li^+$ to the total content of $Li^+$, $Na^+$, and $K^+$ is in a range exceeding 0. The mole ratio ($Li^+$/($Li^+$+$Na^+$+$K^+$)) is more preferably in a range of 0.1 or higher, further preferably in a range of 0.3 or higher, still further preferably in a range or 0.5 or higher, yet further preferably in a range of 0.7 or higher, still more preferably in a range of 0.8 or higher, yet more preferably in a range of 0.9 or higher, and particularly more preferably 1. The above-describe range is preferable for lowering the glass transition temperature, in addition to the lowering of the fragility index value B.

For reducing the fragility index value and lowering the glass transition temperature, a preferred lower limit value of the content of $Li^+$ is 0.1 cationic %, a more preferred lower limit value is 0.5 cationic %, a still more preferred lower limit value is 1 cationic %, an even more preferred lower limit value is 1.5 cationic %, and a yet more preferred lower limit value is 2 cationic %. On the other hand, for maintaining the nigh refractive index characteristic and the favored thermal stability, a preferred upper limit value of the content of $Li^+$ is 9 cationic %, a more preferred upper limit value is 8 cationic %, a still more preferred upper limit value is 7 cationic %, an even more preferred upper limit value is 6.5 cationic %, and a yet more preferred upper limit value is 6 cationic %.

For maintaining the thermal stability and lowering the fracture toughness value, the content of $Na^+$ is preferably in a range from 0 to 10 cationic %, more preferably in a range from 0 to 8 cationic %, and still more preferably in a range from 0 to 6 cationic %, and the content of $K^+$ is preferably in a range from 0 to 5 cationic %, more preferably in a range from 0 to 3 cationic %, and still more preferably in a range from 0 to 1 cationic %.

$Rb^+$ and $Cs^+$ are disadvantageous in terms of the lowering of the fragility index value. In addition, $Rb^+$ and $Cs^+$ are relatively expensive components, among the alkali metal components. Accordingly, each of the content of $Rb^+$ and the content of $Cs^+$ is set to 0 to 3 cationic %. Each of the content of $Rb^+$ and the content of $Cs^+$ is preferably 0 to 2 cationic %, more preferably 0 to 1 cationic %, further preferably 0 to 0.5 cationic %, and even more preferably 0 to 0.1 cationic %. Note that each of the content of $Rb^+$ and the content of $Cs^+$ may be 0 cationic %.

(Alkaline Earth Metal Components)

The alkaline earth metal components are cationic components having functions to adjust the viscosity of the glass, adjust the refractive index thereof, and improve the thermal stability thereof. To achieve the above-described effects, the total content $R^{2+}$ of the alkaline earth metal ions is preferably 20 cationic % or more, more preferably 25 cationic % or more, further preferably 27 cationic % or more, still further preferably 30 cationic % or more, yet further preferably 32 cationic % or more, still more preferably 34 cationic % or more, and even more preferably 36 cationic % or more.

On the other hand, when the total content $R^{2+}$ of the alkaline earth metal ions is excessive, the thermal stability decreases. Hence, the total content $R^{2+}$ of the alkaline earth metal ions is preferably 45 cationic % or less.

A more preferred upper limit of the total content $R^{2+}$ of the alkaline earth metal ions is 43 cationic %, a still more preferred upper limit is 41 cationic %, and an even more preferred upper limit is 39 cationic %.

The alkaline earth metal components include $Ba^{2+}$, $Sr^{2+}$, $Ca^{2+}$, and $Mg^{2+}$.

Among the alkaline earth metal components, it is preferable to increase the content of $Ba^{2+}$, which has a large effect of increasing the refractive index. The mole ratio ($Ba^{2+}/R^{2+}$) of the content of $Ba^{2+}$ to the total content $R^{2+}$ of the alkaline earth metal ions is preferably 0.3 or higher, more preferably 0.4 or higher, further preferably 0.5 or higher, still further preferably 0.6 or higher, and yet more preferably 0.7 or higher.

For increasing the refractive index, a preferred lower limit value of the content of $Ba^{2+}$ is 9 cationic %, a store preferred lower limit value is 18 cationic %, a still more preferred lower limit value is 20 cationic %, and an even more preferred lower limit value is 2 cationic %. For maintaining the thermal stability, a preferred lower limit value of the content of $Ba^{2-}$ is 43 cationic %, a more preferred upper limit value is 40 cationic %, and a still more preferred upper limit value is 37 cationic %.

For adjusting the viscosity of the glass, for adjusting the refractive index thereof, and for improving the thermal stability thereof, the content of $Sr^{2+}$ is preferably in a range from 0 to 10 cationic, mere preferably in a range from 0 to 7 cationic %, and still more preferably in a range from 0 to 4 cationic %; the content of $Ca^{2+}$ is preferably in a range from 0 to 10 cationic %, more preferably in a range from 0 to 7 cationic %, and still more preferably in a range from 0 to 4 cationic %, and the content of $Mg^{2+}$ is preferably in a range from 0 to 12 cationic %, more preferably in a range from 0 to 8 cationic %, and still, more preferably in a range from 0 to 4 cationic %.

($Al^{3+}$)

It is preferable that $Al^{3+}$ be contained as a glass component, because $Al^{3+}$ has functions to improve the thermal stability, the chemical durability, and the processability and also has a function to increase the refractive index. To achieve the above-described effects, the content of $Al^{3+}$ is preferably in a range from 10 to 30% cationic %. From the above-described viewpoints, a preferred lower limit of the content of $Al^{3+}$ is 11 cationic %, a more preferred lower limit is 12 cationic %, a still more preferred lower limit is 14 cationic %, and an even more preferred lower limit is 16 cationic %, whereas a preferred upper limit is 29 cationic %, a more preferred upper limit is 28 cationic %, a still more preferred upper limit is 26 cationic %, and an even more preferred upper limit is 24 cationic %.

(Mole Ratio $R^+/P^{3+}$) of Total Content $R^+$ of Alkali Metal Ions to Content of $P^{5+}$)

To adjust the balance among the optical characteristics, the processability, and the thermal stability, the mole ratio ($R^+/P^{5+}$) of the total content $R^+$ of the alkali metal ions to the content of $P^{5+}$ is preferably in a range from 0.020 to 0.50. From the above-described viewpoint, a more preferred lower limit of the mole ratio ($R^+/P^{3+}$) is 0.030, a still more preferred lower limit is 0.040, an even more preferred lower limit is 0.050, a yet more preferred lower limit is 0.060, an even further preferred lower limit is 0.065, a still further preferred lower limit is 0.07, a even more preferred lower limit is 0.08, a particularly preferred lower limit is 0.09, and the most preferred lower limit is 0.10, whereas a more preferred upper limit is 0.45, a still more preferred upper limit is 0.40, an even more preferred upper limit is 0.35, a yet more preferred upper limit is 0.30, and a yet even more preferred upper limit is 0.20.

(Mole Ratio ($R^{2+}/P^{5+}$) of Total Content $R^{2+}$ of Alkaline Earth Metal Ions to Content of $P^{5+}$)

In addition, to adjust the balance among the optical characteristics, the processability, and the thermal stability, the mole ratio ($R^{2+}/P^{5+}$) of the total content $R^{2+}$ of the alkaline earth metal ions to the content of $P^{5+}$ is preferably in a range from 0.7 to 1.4. From the above-described viewpoint, a more preferred lower limit of the mole ratio ($R^{2+}/P^{5+}$) is 0.8, a still more preferred lower limit is 0.85, and an even more preferred lower limit is 0.9, whereas a more preferred upper limit is 1.3, a still more preferred upper limit is 1.2, and an even more preferred upper limit is 1.1.

($F^-$)

$F^-$ is a component important for imparting low dispersion characteristics and anomalous partial dispersion characteristics, and also has a function to lower the glass transition temperature. An upper limit of the content of $F^-$ is 40 anionic %. To maintain the low dispersion characteristics and the anomalous partial dispersion characteristics, the content of F⁻ is preferably 18 anionic % or more, and is preferably 20 anionic % or more. For the above-described reason, a preferred upper limit of the content of F⁻ is 36 anionic %, a more preferred upper limit is 35 anionic %, a still more preferred upper limit is 33 anionic %, and an even more preferred upper limit is 30 anionic %, whereas a more preferred lower limit of the content of F⁻ is 19 anionic %, and a still more preferred lower limit is 20 anionic %.

($O^{2-}$)

$O^{2-}$ has a function to maintain the thermal stability. To maintain the thermal stability and the high refractive index, the content of $O^{2-}$ is preferably 60 anionic % or more, more preferably 62 anionic % or more, further preferably 65 anionic % or more, still further preferably 67 anionic % or more, and yet more preferably 70 anionic % or more. On the other hand, to maintain the low dispersion characteristics and the anomalous partial dispersion characteristics, the content of $O^{2-}$ is preferably 82 anionic % or less, more preferably 81 anionic % or less, and still more preferably 80 anionic % or less.

($Zn^{2+}$)

$Zn^{2+}$ has functions to maintain the refractive index and improve the thermal stability. However, when $Zn^{2+}$ is contained excessively, the dispersion properties increase, mating it difficult to obtain required optical characteristics. Accordingly, the content of $Zn^{2+}$ is preferably in a range from 0 to 5 cationic %. To achieve the above-described effects, a more preferred upper limit of the content of $Zn^{2+}$ is 3 cationic %, and a still more preferred upper limit is 1 cationic %.

($La^{3+}$)

$La^{3+}$ has a function to increase the refractive index. However, when $La^{3-}$ is contained excessively, the thermal stability decreases. Hence, the content of $La^{3+}$ is preferably in a range from 0 to 3 cationic %, more preferably in a range from 0 to 2 cationic %, and still more preferably in a range from 0 to 1 cationic %.

($Gd^{3+}$)

$Gd^{3+}$ has a function to increase the refractive index. However, when $Gd^{3-}$ is contained excessively, the thermal stability decreases. Hence, the content of $Gd^{3+}$ is preferably in a range from 0 to 5 cationic %, more preferably in a range from 0 to 4 cationic %, and still more preferably in a range from 0 to 3 cationic %.

($Y^{3+}$)

$Y^{3+}$ has functions to maintain the thermal stability and also increase the refractive index. However, when $Y^{3+}$ is contained excessively, the thermal stability decreases. Hence, the content of $Y^{3+}$ is preferably in a range from 0 to 5 cationic %, more preferably in a range from 0 to 4 cationic %, and still more preferably in a range from 0 to 3 cationic %.

Note that, to maintain the thermal stability and also increase the refractive index, the total content of $La^{3+}$, $Gd^{3+}$, and $Y^{3+}$ is preferably in a range from 0 to 5 cationic %, more preferably in a range from 0 to 4 cationic %, and still more preferably in a range from 0 to 3 cationic %.

($Si^{4+}$)

A small amount of $Si^{4+}$ may be contained. However, when $Si^{4+}$ is contained excessively, the me liability and the thermal stability deteriorate. Accordingly, the content of $Si^{4+}$ is preferably in a range from 0 to 3 cationic %, more preferably in a range from 0 to 2 cationic %, and still more preferably in a range from 0 to 1 cationic %.

($B^{3+}$)

Also, a small amount of $B^{3+}$ may be contained. However, when $B^{3+}$ is contained excessively, the meltability and the thermal stability deteriorate. Accordingly, the content of $B^{3+}$ is preferably in a range from 0 to 3 cationic %, more preferably in a range from 0 to 2%, further preferably in a range from 0 cationic %, inclusive, to 1 cationic %, exclusive, still further preferably in a range from 0 to 0.8 cationic %, yet further preferably in a range from 0 to 0.5 cationic %, and further even more preferably in a range from 0 to 0.1 cationic %. When the glass contains $B^{3+}$, the volatility of the molten glass remarkably increases. Hence, it is particularly preferable that the glass should not contain $B^{3+}$.

($Cl^-$)

When molten glass flows out though a pipe, wetting-up of the glass along the outer periphery of the pipe may occur. To suppress the wetting-up, and to suppress deterioration in quality of the glass due to the wetting-up, it is effective that the glass contains $Cl^-$. The content of $Cl^-$ is preferably in a range from 0 to 1 anionic %, more preferably in a range from 0 to 0.5 anionic %, and still more preferably in a range from 0 to 0.3 anionic %. $Cl^-$ also has an effect of a def earning agent.

(Other Components)

In addition, small amounts of $Sb^{3+}$, $Ce^{4+}$, and the like can also be added as clarifying agents. The total amount of the clarifying agents is preferably from 0 cationic %, inclusive, to 1 cationic %, exclusive.

It is preferable that none of the components such as Pb, Cd, As, Th, and Cs, which may impose a burden on the environment, be contained. Furthermore, the optical glass of the present invention achieves high transmittance over a wide range in the visible region. To take the advantage, it is preferable that no coloring agent be contained. Examples of the coloring agent include Cu, Co, Ni, Fe, Cr, Eu, Nd, Er, and the like. Moreover, because not only it is unnecessary to introduce any of Hf, Ga, Ge, Te, Tb, and the like, but also these components are expensive, it is preferable that none of Hf, Ga, Ge, Te, Tb, and the like be contained.

(Mole Ratio ($O^{2-}/P^{5+}$) of Content of $O^{2-}$ to Content of $P^{5+}$)

To reduce the volatility, corrosive mature, and reactivity at the melting of the glass, the mole ratio $O^{2-}/P^{5+}$ is preferably 7/2 or higher, i.e., 3.5 or higher. If metaphosphate (O:P=3:1) is present in the molten material at the melting of glass, the metaphosphate reacts with fluorine to form phosphcryl fluoride ($POF_3$), which is highly volatile. To reduce the volatility, corrosive nature, and reactivity at the melting of the glass, it is necessary that P and O in the glass have the diphosphoric acid structure (O:P=7:2). When the mole ratio $O^{2-}/P^{5+}$ is set to 7/2 or higher, the structure of P and O in the glass can be the diphosphoric acid structure. If the mole ratio $O^{2-}/P^{5+}$ is lower than 7/2, the metaphosphoric acid structure is present, and it is hence difficult to reduce the volatility, corrosive nature, and reactivity at the melting of the glass. Here, the value 3.5 means that the ratio of the number of the oxygen atoms to the number of the phosphorus atoms is 7/2. Hence, the value 3.5 is exactly equal to 7/2. When the mole ratio $O^{2-}/P^{5+}$ is set to 3.5 or higher, i.e., 7/2 or higher, the volatility can be greatly reduced. The reduction in volatility makes it possible to prevent the alteration of the glass surface is a high-temperature state due to volatilization as in the case of molten glass, and suppress the formation of striae on the surface. In addition, since the fluctuation in glass composition due to the volatilization can be suppressed, the fluctuation in optical characteristics such as the refractive index and the Abbe number can also be suppressed. Moreover, when the mole ratio $O^{2-}/P^{5+}$ is set to 3.5 or higher, the corrosive nature of the glass at the melting can also be reduced, and hence the corrosion of a melting vessel and a stirring rod used for homogenizing the glass can be suppressed. For this reason, it is possible to prevent the glass from being contaminated with platinum or a platinum alloy constituting the melting vessel or the stirring rod due to the corrosion, and to prevent the quality of the glass from being deteriorated by these foreign substances.

[Properties of Optical Glass]

The optical glass of the present invention preferably has an Abbe number vd in a range of 70 or lower, in order to achieve anomalous partial dispersion characteristics and a high refractive index, and also maintain the thermal stability.

The Abbe number vd is a value indicative of a property relating to dispersion, and is represented by using the refractive indices nd, nF, and nc measured using the d-line, the F-line, and the c-line, respectively, as follows:

$$vd=(nd-1)/(nF-nc).$$

A preferred upper limit of the Abbe number vd is 69.5, and a more preferred upper limit is 69. On the other hand, to take advantage of the low dispersion characteristics, a preferred lower limit of the Abbe number vd is 60, a more preferred lower limit is 62, a still more preferred lower limit is 64, an even more preferred lower limit is 64.5, a yet more preferred lower limit is 65, and a still even more preferred lower limit is 65.5.

Moreover, by setting the refractive index nd so as to satisfy the following formula (1), it is possible to reduce the absolute value of the curvature of the optically functional surface of a lens (to make gentle the curve of the optically functional surface of the lens), while keeping the light-gathering power at the same level. In each of precision press molding, grinding, and polishing, a lens having an optically functional surface with a gentler curve is easier to prepare. Hence, the use of a glass with a high refractive index makes it possible to increase the productivity of an optical element. Moreover, by increasing the refractive index, it is also possible to provide a glass material preferable for an optical element used, for a high-functionality and compact optical system.

In the optical glass of the present invention, a more preferred range of the refractive index nd is the range satisfying the following formula (2), and a still more preferred range of the refractive index nd is the range satisfying the following formula (3).

$$nd \geq 1.62140-0.0071 \times vd \quad (1)$$

$$nd \geq 2.06640-303371 \times vd \quad (2)$$

$$nd \geq 2.07140-0.0071 \times vd \quad (3)$$

The optical glass of the present invention has excellent thermal stability. In a preferred mode, the optical glass of the present invention achieves a liquidus temperature of 900° C. or lower. In a more preferred mode, the optical glass of the present invention even achieves a liguidus temperature of 880° C. or lower. Since a glass having a low liguidus temperature as described above can flow out at a low temperature, the glass can be adjusted to have a viscosity in a state suitable for molding, without devitrification.

The optical glass of the present invention has positive anomalous dispersion characteristics. The anomalous dispersion characteristics are quantitatively expressed by $\Delta Pg,F$. The partial, dispersion ratio $Pg,F$ can be expressed by using the refractive indices ng, nF, and nc measured with the g-line, the F-line, and the c-line, respectively, as $(ng-nF)/(nF-nc)$.

When $Pg,F(0)$ denotes the partial dispersion ratio on the normal line which shows a standard of normal partial dispersion glass in a partial dispersion ratio Pg, F-Abbe number vd diagram, the Pg, F(0) can be expressed by the following formula using the Abbe number vd;

$$Pg,F(0)=0.6483-(0.0018 \times vd),$$

where $\Delta Pg,F$ is the deviation of the partial dispersion ratio Pg,F from the normal line, and is expressed by the following formula:

$$\Delta Pg, F = Pg, F - Pg, F(0)$$
$$= Pg, F + (0.0018 \times vd) - 0.6483.$$

Regarding the optical glass of the present invention, a glass preferable from the viewpoint of the anomalous dispersion characteristics is a glass with a $\Delta Pg,F$ of 0.0158 or greater. A more preferred glass has a $\Delta Pg,F$ of 0.0165 or greater, and a still mere preferred glass has a $\Delta Pg,F$ of 0.0180 or greater. The anomalous dispersion characteristics make it possible to provide a glass further preferable in terms of higher-order chromatic aberration correction.

[Knoop Hardness]

To further improve the processability of the optical glass of the present invention, the Knoop hardness $H_K$ of the optical glass is preferably 390 MPa or higher, more preferably 320 MPa or higher, and still more preferably 340 MPa or higher.

The above-described optical glass makes it possible to stably produce an optical element and a preform for precision press molding with high processed surface precision and without processing flaws. In addition, it is also possible to stably conduct a centering process of a lens produced by precision press molding, without breaking of the glass.

[Glass Transition Temperature Tg]

A preferred mode of the present invention is an optical glass having a glass transition temperature Tg of 580° C. or lower. When the glass transition temperature is low, the heating temperature at the reheating, softening, and press molding of the glass can be lowered. Consequently, it is easier to suppress the fusion between the glass and a mold for press molding. In addition, since the heating temperature can be lowered, it is also possible to reduce the thermal wearing of a glass heating apparatus, a mold for press molding, and the like. Moreover, since the annealing temperature of the glass can also be lowered, the lifetime of an annealing furnace can be extended. The glass transition temperature is more preferably in a range from 570° C. or lower, still more preferably in a range from 560° C. or lower, even more preferably in a range from 55° C. or lower, and yet more preferably in a range from 540° C. or lower.

[Crystallization Peak Temperature]

When the temperature of glass is elevated in a differential scanning calorimeter (DSC), first an endothermic peak appears, and after further elevation of the temperature, an exothermic peak appears. The temperature at the top of this exothermic peak is the crystallization peak temperature Tc. The crystallization peak temperature Tc is determined as follows. Specifically, glass powder obtained by sufficiently crushing glass by using a mortar is used as a sample, and a differential scanning calorimetry curve (DSC curve) is obtained by using a differential scanning calorimeter. In the DSC curve, the horizontal axis represents the temperature, and the vertical axis represents the amount corresponding to the heat released or absorbed by the sample. In this DSC curve, the temperature at which the exothermic peak reaches the maximum is determined as the crystallization peak, temperature Tc.

For softening and molding glass by heating, it is necessary to heat the glass to a temperature higher than the glass transition temperature. When the temperature of glass reaches a crystallization temperature region, the glass undergoes devitrification. The crystallization peak temperature Tc can be considered as a temperature representative of the crystallization temperature region. Hence, a glass having a smaller difference (Tc−Tg) between the crystallization peak temperature Tc and the glass transition temperature Tg is less susceptible to devitrification, during the molding involving reheating.

In this embodiment, the difference (Tc−Tg) between the crystallization peak temperature Tc and the glass transition temperature Tg is preferably 80° C. or more in view of prevention of the devitrification during the molding involving reheating. The difference Tc−Tg is preferably in a range from 85° C. or more. In view of prevention of the devitrification, a higher lower limit is more preferable in the order of 90° C. or more, 95° C. or more, 100° C. or more, 105° C. or more, 110° C. or more, 115° C. or more, and 120° C. or more.

Note that some glass excellent in devitrification resistance may have no crystallization peak temperature observable with a differential scanning calorimeter. Such a glass having no crystallization peak temperature is also a glass resistant to devitrification during reheating and molding, and hence preferable in this embodiment.

In an example of a method for producing an optical element, a glass material is reheated, softened, and molded to produce a molded article such as an optical element blank. Then, this molded article is machined to produce an optical element. In a glass susceptible to devitrification, crystals tend to precipitate in the glass surface during reheating and molding. If a surface in which crystals precipitate is ground, cracks tend to be formed, starting from the precipitated crystals. Accordingly, the improvement in devitrification resistance during reheating and molding is effective also in terms of prevention of breakage of glass during a grinding process. When the abrasion factor and the fragility index value are set within the predetermined ranges, and when the glass has no Tc, or when the glass has Tc, but the Tc−Tg is large, the breakage of the glass during processing can be further suppressed.

[Liguidus Temperature]

A preferred mode of the present invention is an optical glass having a liquidus temperature of 850° C. or lower. If the liquidus temperature is low, the melting and molding temperature of the glass can be lowered. Consequently, the volatility of the glass during the melting and molding can be reduced, and formation of striae and fluctuation of optical characteristics can be suppressed.

The liquidus temperature is more preferably in a range from 840° C. or lower, still more preferably in a range from 830° C. or lower, and even more preferably in a range from 810° C. or lower.

Mote that the thermal stability of glass refers to high temperature devitrification resistance using the liquidus temperature as an index and relatively low-temperature devitrification resistance using Tc−Tg as an index.

[Method for Producing Optical Glass]

The above-described optical glass can be obtained, for example, by blending, melting, and molding raw materials for glass so that required properties can be obtained, its the raw materials for glass, for example, phosphates, fluorides, alkali metal compounds, alkaline earth metal compounds, and the like may be used. As a method for melting the glass and a method for molding the glass, known methods may be used.

[Glass Material for Press Molding, Method for Producing the Same, and Method for Producing Molded Glass Article]

A glass material for press molding means a glass block to be heated and press molded.

Examples of the glass material for press molding include glass blocks having masses equivalent to the masses of press molded articles, such as preforms for precision press molding and glass materials (glass gobs for press molding) for press molding optical element blanks.

The glass material for press molding is produced through a step of processing a molded glass article. The molded glass article is produced by heating and melting raw materials for glass as described above and molding the obtained molten glass. Examples of the method for processing the molded glass article include slicing, grinding, polishing, and the like. Since the optical glass excellent in processability is processed, the glass can be more reliably prevented from being broken during the processing.

[Optical Element Blank, and Method for Producing the Same]

An optical element blank comprises the above-described optical glass. The optical element blank is a molded glass article having a shape similar to that of an optical element to be produced. The optical element blank may be produced by a method in which the glass is molded into a shape including the shape of the optical element to be produced and, in addition, a margin for processing to be removed by processing, or other methods. For example, the optical element blank can be produced by a method (reheat press method) in which the glass material for press molding is heated, softened, and press molded, a method (direct press method) in which a molten glass block is supplied to a mold for press molding and press molded by a known method, or the like.

Since the optical element blank is made of the glass excellent in processability, the glass is less likely to be broken daring grinding and polishing, so that an optical element can be produced stably.

[Optical Element and Method for producing the Same]

An optical element comprises the above-described optical glass. Examples of types of the optical element include lenses such as spherical lenses and aspherical lenses, prisms, diffraction gratings, and the like. The shapes of the lenses include various shapes such as those of biconvex lenses, piano-convex lenses, biconcave lenses, piano-concave lenses, convex-meniscus lenses, concave-meniscus lenses, and the like. The optical element can be produced by a method comprising a step of processing a molded glass article comprising the above-described optical glass. Examples of the processing include slicing, cutting, coarse grinding, fine grinding, polishing, and the like. In any of these processes, the use of the above-described glass makes it possible to reduce the breakage, so that a high-quality optical element can be supplied stably.

EXAMPLES

Hereinafter, Examples are shown for specifically describing the present invention. However, she present invention, is not limited only to the Examples below.

Example 1

Preparation of Optical Glasses and Evaluation of Properties

As raw materials for introducing components, corresponding phosphates, fluorides, oxides, and the like were used to achieve the glass composition shown in Tables 1 and 2. The raw materials were weighed and sufficiently mixed with each other to prepare a raw material blend. The raw material blend was placed in a platinum crucible, and heated and melted. After melting, the molten glass was poured into a casting mold. After being cooled to a temperature near the glass transition temperature, the glass was immediately introduced into an annealing furnace, and subjected to an annealing treatment in a glass transition temperature range for approximately 1 hour. After that, the glass was cooled in the furnace to room temperature. Thus, an optical glass of Glass No. 1 was obtained. The obtained optical glass was observed in an enlarged manner under an optical microscope, hone of precipitation of crystals, foreign substances such as platinum particles, and bubbles was observed, and no striae were observed. Table 3 shows the properties of the thus obtained optical glass.

The properties of the optical glass were measured by the methods shown below.

(1) Refractive Indices nd, ng, nF, and nc and Abbe Member νd

The refractive indices nd, ng, nF, and nc and the Abbe number νd of the glass obtained by cooling at a rate of temperature drop of −30° C./hour were measured by the refractive index measuring method specified in the standard of the Japan Optical Glass Manufacturers' Association.

(2) Deviation ΔPg,F of Partial Dispersion Ratio from Normal Line

The deviation ΔPg,F was calculated from the partial dispersion ratio Pg,F calculated from the refractive indices ng, nF, and nc and the partial dispersion ratio Pg,F(0) on the normal line calculate from the Abbe number νd.

(3) Liquidus Temperature LT

The glass was placed in a furnace heated to a predetermined temperature, and held for 2 hours. After cooling, the inside of the glass was observed with an optical microscope at 100 times magnification, and the liquidus temperature was determined on the basis of the presence or absence of crystals. The temperature shown in the column named liquidus temperature in Table 1 means that no crystal precipitation was observed, when the glass was held at that temperature for 2 hours, indicating that the liquidus temperature was equal to or lower than the temperature.

(4) Glass Transition Temperature Tg

The glass transition temperature Tg was measured with a differential scanning calorimeter (DSC) at a rate of temperature rise of 10° C./minute.

(5) Crystallization Peak Temperature Tc

The crystallization peak temperature Tc was measured with a differential scanning calorimeter (DSC) at a rate of temperature rise of 10° C./minute.

(6) Abrasion Factor $F_A$

The abrasion factor $F_A$ was measured by the above-described method.

(7) Fracture Toughness value Kc and Fragility Index Value 8

The fracture toughness value Kc was measured by a method according to the "Testing methods for fracture toughness value of fine ceramics" of JIS R1607. However, the measurement was conducted at a test load, of 100 gf for a loading time of 15 seconds in an environment of a temperature of 20±0.5° C. and a relative humidity of 50%.

(8) Knoop Hardness $H_K$

A load of 0.9807 N was applied to a polished flat glass surface for 15 seconds with a quadrangular pyramidal indenter made of diamond and having a rhombic transverse cross-section with dihedral angles of 172°30' and 130° to form an indentation, and the length of the longer diagonal line of the formed permanent indentation was measured. Then, the Knoop hardness $H_K$ was calculated by the following formula:

$$H_K = 1.451 \times (F/l^2),$$

where F represents the load [N], and the length l represents the length [mm] of the longer diagonal line of the permanent indentation.

(9) Glass Composition

The content of each component was quantitatively determined by the inductively coupled plasma atomic emission spectroscopy (ICP-AES method) or the ion chromatography.

(10) Specific Gravity

The specific gravity was measured by the Archimedes' method.

TABLE 1

| | Cationic component (cationic %) | | | | | | | | | | | | | |
|---|---|---|---|---|---|---|---|---|---|---|---|---|---|---|
| Glass | $P^{5+}$ | $Al^{3+}$ | $Li^+$ | $Na^+$ | $Mg^{2+}$ | $Cs^{2+}$ | $Sr^{2+}$ | $Ba^{+2}$ | $Zn^{2+}$ | $Y^{3-}$ | $Gd^{3+}$ | $Rb^+$ | $Cs^+$ | Total |
| No. 1 | 38.0 | 20.9 | 5.0 | 0.0 | 0.0 | 0.0 | 0.0 | 36.1 | 0.0 | 0.0 | 0.0 | 0.0 | 0.0 | 100.0 |
| No. 2 | 35.7 | 21.7 | 1.3 | 0.0 | 0.0 | 3.8 | 0.0 | 37.5 | 0.0 | 0.0 | 0.0 | 0.0 | 0.0 | 100.0 |
| No. 3 | 36.5 | 21.5 | 2.5 | 0.0 | 0.0 | 2.5 | 0.0 | 37.0 | 0.0 | 0.0 | 0.0 | 0.0 | 0.0 | 100.0 |
| No. 4 | 38.3 | 14.7 | 1.3 | 0.0 | 7.7 | 1.8 | 0.3 | 34.1 | 0.0 | 0.0 | 1.6 | 0.0 | 0.0 | 100.0 |
| No. 5 | 38.0 | 20.9 | 0.0 | 5.0 | 0.0 | 0.0 | 0.0 | 36.1 | 0.0 | 0.0 | 0.0 | 0.0 | 0.0 | 100.0 |
| No. 6 | 34.0 | 26.2 | 2.9 | 0.0 | 0.0 | 0.0 | 0.0 | 36.9 | 0.0 | 0.0 | 0.0 | 0.0 | 0.0 | 100.0 |
| No. 7 | 33.3 | 20.9 | 5.0 | 0.0 | 2.7 | 2.0 | 0.0 | 36.1 | 0.0 | 0.0 | 0.0 | 0.0 | 0.0 | 100.0 |

TABLE 2

| | Anionic component (anionic %) | | | | Total of alkali metal components | Total of alkaline earth metal components | $(Li^+ + Na^+ + K^+)/P^{5+}$ | $(Mg^{2+} + Ca^{2+} + Sr^{2+} + Ba^{2+})/P^{5+}$ | $O^{2-}/P^{5+}$ | $Al^{3+}P^{5+}$ |
|---|---|---|---|---|---|---|---|---|---|---|
| Glass | $F^-$ | $O^{2-}$ | $Cl^-$ | Total | | | | | | |
| No. 1 | 25.40 | 74.39 | 0.21 | 100 | 5.00 | 36.10 | 0.132 | 0.95 | 3.72 | 0.55 |
| No. 2 | 27.73 | 72.06 | 0.21 | 100 | 1.30 | 41.30 | 0.035 | 1.16 | 3.84 | 0.61 |
| No. 3 | 26.69 | 73.10 | 0.21 | 100 | 2.50 | 39.50 | 0.068 | 1.08 | 3.79 | 0.39 |

TABLE 2-continued

| | Anionic component (anionic %) | | | | Total of alkali metal components | Total of alkaline earth metal components | $(Li^+ + Na^+ + K^+)/P^{5+}$ | $(Mg^{2+} + Ca^{2+} + Sr^{2+} + Ba^{2+})/P^{5+}$ | $O^{2-}/P^{5+}$ | $Al^{3+}/P^{5+}$ |
|---|---|---|---|---|---|---|---|---|---|---|
| Glass | $F^-$ | $O^{2-}$ | $Cl^-$ | Total | | | | | | |
| No. 4 | 28.31 | 71.48 | 0.21 | 100 | 1.30 | 43.90 | 0.033 | 1.15 | 3.59 | 0.38 |
| No. 5 | 25.31 | 74.49 | 0.20 | 100 | 5.00 | 36.10 | 0.132 | 0.95 | 3.70 | 0.55 |
| No. 6 | 30.22 | 69.58 | 0.20 | 100 | 2.90 | 36.90 | 0.065 | 1.09 | 3.93 | 0.77 |
| No. 7 | 30.16 | 69.64 | 0.20 | 100 | 5.00 | 40.80 | 0.150 | 1.23 | 3.89 | 0.63 |

| Properties | No. 1 |
|---|---|
| Specific gravity | 4.13 |
| nd | 1.59276 |
| vd | 68.68 |
| Vickers hardness [MPa] | 425 |
| Fragility index value B [$\mu m^{-1/2}$] | 3807 |
| Abrasion factor $F_A$ | 480 |
| Glass transition temperature Tg [° C.] | 539 |
| Crystallization, peak temperature Tc [° C.] | 666 |
| Tc - Tg [° C.] | 127 |
| ng | 1.60409 |
| nF | 1.59939 |
| nc | 1.59075 |
| Pg, F | 0.5432 |
| ΔPg, F | 0.0135 |
| Liquidus temperature [° C.] | 790 |
| Knoop hardness [MPa] | 370 |

Examples 2 to 7

Preparation of Optical Glasses and Evaluation of Properties

Glasses with Glass Nos. 2 to 7 having the glass compositions shown in Tables 1 and 2 were obtained by the same method as in Example 1, The obtained optical glasses were observed with an optical microscope in an enlarged manner. None of precipitation of crystals, foreign substances such as platinum particles, and bubbles was observed, and striae were not observed. Table 4 shows the properties of the thus obtained optical glasses.

The properties of the optical glasses were measured by the methods shown in Example 1.

Note that no crystallization peak temperature was detected tor Glass No. 4 in Table 4. Since Glass No. 4 had no crystallization peak temperature Tc, it was impossible to calculate the Tc–Tg, and this was expressed by "–" in the cell for the Tc–Tg of Glass do, 4 in Table 4.

Example 8

Preparation of Glass Gobs for Press Molding

Raw materials for glass blended to obtain seven optical glasses prepared in Example 1 to 7 were melted, clarified, and homogenized to form molten glasses. Each of the molten glasses was allowed to continuously flow out, poured into a casting mold, and molded into a glass block. Then, the glass block was annealed and cut to obtain multiple glass pieces. These glass pieces were barrel polished to prepare glass gobs for press molding made of each of the above-described glasses. By processing the glass block, the glass gobs for press molding were successfully prepared without breakage of the glass.

Example 9

Preparation 1 of Lens Blanks

A powdery mold-release agent made of boron nitride was uniformly applied onto the surfaces of the glass gobs prepared in Example 8. Then, the glass gobs were heated and softened in the air and press molded by using molds for press molding to prepare blanks for various lenses including spherical convex-meniscus lenses, spherical concave-meniscus lenses, spherical biconvex lenses, and spherical biconcave lenses. Thus, the lens blanks mode of the above-described glasses were prepared.

TABLE 4

| | Properties | | | | | | | | |
|---|---|---|---|---|---|---|---|---|---|
| Glass | Specific gravity | nd | vd | Vickers hardness [MPa] | Fragility index value B [$\mu m^{-1/2}$] | Abrasion factor FA | Glass transition temperature Tg [° C.] | Crystallization peak temperature Tc [° C.] | Tc - Tg [° C.] |
| No. 2 | 4.183 | 1.59499 | 69.47 | 435 | 3841 | 440 | 575 | 683 | 108 |
| No. 3 | 4.164 | 1.5934 | 69.24 | 434 | 3891 | 450 | 561 | 678 | 117 |
| No. 4 | 4.131 | 1.58578 | 69.53 | 431 | 3773 | 510 | 541 | Not detected | — |
| No. 5 | 4.108 | 1.58654 | 68.52 | 419 | 3729 | 510 | 551 | 704 | 153 |
| No. 6 | 4.183 | 1.58725 | 70.08 | 454 | 3724 | 420 | 574 | 679 | 105 |
| No. 7 | 4.180 | 1.58865 | 69.42 | 447 | 3825 | 440 | 547 | 682 | 135 |

Example 10

Preparation 2 of Lens Blanks

The molten glasses prepared in Example 8 were caused to flow out, and the molten glass flows were cut by using shears to separate molten glass blocks. The molten glass blocks were press molded by using molds for press molding to prepare blanks fox various lenses including spherical convex-meniscus lenses, spherical concave-meniscus lenses, spherical biconvex lenses, and spherical biconcave lenses. Thus, lens blanks made of the seven glasses were prepared.

Example 11

Preparation 1 of Lenses

The lens blanks prepared in Examples 9 and 10 were annealed to remove strains and adjust the refractive indices to desired values. Then, the surfaces of the lens blanks were subjected to spherical grinding by using a curve generator. Note that, for the spherical grinding, a grindstone of #2000 (metal) was used, and the feed speed was set to 360 µm/minute. Next, the ground surfaces were subjected to a smoothing process (fine grinding process), and further to a polishing process to prepare various lenses including spherical convex-meniscus lenses, spherical concave-meniscus lenses, spherical biconvex lenses, and spherical biconcave lenses. Thus, the lenses made of the above-described glasses were prepared. In each step, the glasses were successfully processed without breakage. The production yields of the lenses were 90% or higher,

Example 12

Preparation 2 of Lenses

The molten glass prepared in Example 5 was caused to flow out, and poured, into a casting mold to prepare a glass block. The block was cut, ground, and polished to prepare spherical lenses and prisms made of the above-described glass. In each step, the glass was successfully processed without breakage.

Example 13

Preparation 1 of Preforms

Each of one molten glasses prepared in Example 8 was dropped through a platinum nozzle, and received with molds for forming preforms. While being floated by application of a wind pressure, the glass was molded into spherical preforms made of the above-described glass.

In addition, each of the above-described molten glasses was continuously caused to flow out thorough a platinum pipe, and the lower end portion of the molten glass was received by a mold for molding a preform to form a neck portion in the molten glass flow. Then, the mold for molding a preform was allowed to rapidly fall dawn just under the molten glass flow to cut the molten glass flow at the neck portion. The separated molten glass block was received on the mold for molding a preform, and molded into a preform made of each of the glasses, while being floated by application ox a wind pressure.

In the obtained preforms, none of devitrification, striae, inclusion of foreign substances or bubbles was observed.

Example 14

Preparation 2 of Preforms

The molten glass prepared in Example 5 was caused to continuously flow out, and poured into a casting mold. Thus, the molten glass was molded into a glass block. Then, the glass block was annealed and cut to obtain multiple glass pieces. These glass pieces were ground and polished to prepare preforms made of each of the above-described various glasses. Note that none of devitrification, striae, foreign substances, and bubbles was observed in the inside of the glass block, i.e., the portion used for preforms.

In each step, the glass was successfully processed without breakage.

Example 15

Centering Process of Lenses

The surface of each of the preforms prepared in Examples 13 and 14 was coated with a carbon-containing film, and the preform was introduced into a mold for press molding including upper and lower molds and a drum mold made of SiC and provided with carbon-based mold-release films on molding surfaces thereof. Then, the mold and the preform were heated together in a nitrogen atmosphere to soften the preform. The softened preform was precision press molded to prepare various lenses including aspherical convex-meniscus lenses, aspherical concave-meniscus lenses, aspherical biconvex lenses, and aspherical biconcave lenses made of the above-described various glasses.

The thus obtained various lenses were subjected to a centering process. The glasses were not broken during the centering process.

Comparative Example 1

Reparation of Lenses

Glass gobs for press molding made of glass A were prepared in the same manner as in Example 8. The glass gobs were heated, softened, and press molded to prepare lens blanks. Next, the lens blanks were subjected to spherical grinding using a curve generator under the same conditions as in Example 11. Cracks were formed on the ground surfaces during the spherical grinding process, and the production yield of the lenses was about 70%.

Comparative Example 2

Two types of glass, namely, No. 5 (hereinafter, referred to as No. 10) described in Table 1 of Patent Literature 2 and Example 7 (hereinafter, referred to as No. 11) described in Japanese Patent Application Publication No. 2003-160350, in which a fluorophosphate glass is disclosed, were reproduced. Tables 5 and 6 show the composition of each of the glasses Nos. 10 and 11.

Table 7 shows the properties of the glasses Nos. 10 and 11. When the properties are described in Patent Literature 2 or Japanese Patent Application Publication No. 2003-160356, the numeric values described in the document are listed in Table 7. Meanwhile, the properties not described in any of these documents were measured by the methods described in Example 1 of this case, and the results are shown in Table 6.

TABLE 5

| Glass | Cationic component (cationic %) | | | | | | | | | | | | | | Total |
|---|---|---|---|---|---|---|---|---|---|---|---|---|---|---|---|
| | $P^{5+}$ | $Al^{3+}$ | $Li^+$ | $Na^+$ | $Mg^{2+}$ | $Ca^{2+}$ | $Sr^{2+}$ | $Ba^{2+}$ | $Zn^{2+}$ | $Y^{3+}$ | $Gd^{3+}$ | $Sn^{2+}$ | $Rb^+$ | $Cs^+$ | |
| No. 10 | 35 | 22 | 0.0 | 0.0 | 0.0 | 5 | 0.0 | 38 | 0.0 | 0.0 | 0.0 | 0.0 | 0.0 | 0.0 | 100 |
| No. 11 | 45 | 18.75 | 0.63 | 0.0 | 0.0 | 0.94 | 0.94 | 30 | 0.0 | 3.75 | 0.0 | 0.0 | 0.0 | 0.0 | 100 |

TABLE 6

| Glass | Anionic component (anionic %) | | | | Total of alkali metal components | Total of alkaline earth metal components | $(Li^+ + Na^+ + K^+)/P^{5+}$ | $(Mg^{2+} + Ca^{2+} + Sr^{2+} + Ba^{2+})/P^{5+}$ | $O^{2-}/P^{5+}$ | $Al^{3+}/P^{5+}$ |
|---|---|---|---|---|---|---|---|---|---|---|
| | $O^{2-}$ | $F^-$ | $Cl^-$ | Total | | | | | | |
| No. 10 | 69.13 | 30.47 | 0.40 | 100 | 0.00 | 43.00 | 0.000 | 1.229 | 3.83 | 0.629 |
| No. 11 | 60.84 | 39.16 | 0.00 | 100 | 0.63 | 31.88 | 0.014 | 0.708 | 3.00 | 0.417 |

TABLE 7

| | Properties | | | | | |
|---|---|---|---|---|---|---|
| Glass | Specific gravity | nd | vd | Vickers hardness [MPa] | Fragility index value B [$\mu m^{-1/2}$] | Abrasion factor $F_A$ |
| No. 10 | 4.20 | 1.5872 | 69.17 | 431 | 4444 | 460 |
| No. 11 | 4.04 | 1.5691 | 70.61 | — | — | — |

The glass No. 10 did not contain any alkali metal component and had a fragility index value exceeding 4000 $\mu m^{-1/2}$.

Lens blanks were prepared by using the optical glass No. 10 in the same manner as in Comparative Example 1, and were subjected to spherical grinding by using a curve generator. Cracks were formed on the ground surfaces during the spherical grinding processing, and the production yield of the lenses of each of the glasses was about 70%.

It was possible to measure the refractive index and the Abbe number of the glass No. 11, and the measurement results agreed with the values reported in Japanese Patent Application Publication No. 2003-160356. However, crystals were precipitated in some places of the molded glass, and it was not possible to measure the Vickers hardness, the fragility index value, the glass transition temperature, and the crystallization peak temperature of the glass No. 11 as a uniform glass. In addition, striae were observed on the surfaces of the molded glass.

Finally, the embodiments are summarized by using figures and the like.

The optical glass according to an embodiment of the present invention is, as shown in Tables 1 and 2, an optical glass comprising $P^{5+}$ as a cationic component and $O^{2-}$ and $F^-$ as anionic components, and satisfies the following conditions: the content of $F^-$ is 40 anionic % or less, the abrasion factor $F_A$ is 420 or higher, and the fragility index value B [$\mu m^{-1/2}$] is 4000 $\mu m^{-1/2}$ or lower.

Preferably, this optical glass contains $P^{5+}$, $Al^{3+}$, alkali metal ions, and alkaline earth metal ions as cationic components, wherein the content of $P^{5+}$ is 20 to 45 cationic %, the content of $Al^{3+}$ is 10 to 30 cationic %, the total content $R^+$ of the alkali metal ions exceeds 0 cationic % and is 12 cationic % or less, the total content $R^{2+}$ of the alkaline earth metal ions is 20 cationic % or more, the content of $Rb^+$ is 0 to 3 cationic %, and the content of $Cs^+$ is 0 to 3 cationic %.

Further preferably, this optical glass has a content of $F^-$ of 18 to 40 anionic % and a content of $O^{2-}$ of 60 to 82 anionic %.

In addition, in this optical glass, the mole ratio ($R^+/P^{5+}$) of the total content $R^+$ of the alkali metal ions to the content of $P^{5+}$ is preferably 0.020 to 0.50. In this optical glass, the mole ratio ($O^{2-}/P^{5+}$) of the content of $O^{2-}$ to the content of $P^{5+}$ is preferably 3.5 or higher.

In this optical glass, the mole ratio ($Li^+/R^+$) of the content of $Li^+$ to the total content $R^+$ of the alkali metal ions further preferably exceeds 0. In this optical glass, the mole ratio ($R^{2+}/P^{5+}$) of the total content $R^{2+}$ of the alkaline earth metal ions to the content of $P^{5+}$ is further preferably 0.7 to 1.4.

This optical glass further preferably has an Abbe number vd of 70 or lower.

This optical glass further preferably has a glass transition temperature of 580° C. or lower.

This optical glass further preferably has no crystallization peak temperature Tc, or has a crystallization peak temperature Tc, and the difference (Tc−Tg) between the crystallization peak temperature Tc and the glass transition temperature Tg is 80° C. or more.

This optical glass further preferably has a liquidus temperature of 850° C. or lower.

This optical glass further preferably has a deviation ΔPg,F of a partial dispersion ratio Pg,F of 0.0158 or more.

In addition, this optical glass is preferably an optical glass to be subjected to a polishing process.

In addition, another aspect of the embodiment provides a glass material for press molding, an optical element blank, and an optical element. Here, each of the glass material for press molding, the optical element blank, and the optical element comprises the optical glass.

Moreover, a still another aspect of the embodiment provides a method for producing a glass material for press molding. This production method comprises a step of processing a molded glass article comprising the optical glass.

Moreover, another aspect of the embodiment provides a method for producing an optical element. This production method comprises a step of processing a molded glass article comprising the optical glass.

According to an aspect of the embodiment of the present invention, as shown in Table 1, the optical glass comprises $P^{5+}$, $Al^{3+}$, alkali metal ions, and alkaline earth metal ions as cationic components and $O^{2-}$ and $F^-$ as anionic components, wherein the content of $P^{5+}$ is 20 to 45 cationic %, the content of $Al^{3+}$ is 10 to 30 cationic %, the total content $R^+$ of the alkali metal ions exceeds 0 cationic % and is 12 cationic % or less, the total content $R^{2+}$ of the alkaline earth metal ions is 20 cationic % or more, the content of $Rb^+$ is 0 to 3 cationic %, the content of $Cs^+$ is 0 to 3 cationic %, the content of $F^-$ is 18 to 40 anionic %, the content of $O^{2-}$ is 60 to 82 anionic the mole ratio $(R^+/P^{5+})$ of the total content $R^+$ of the alkali metal ions to the content of $P^{5+}$ is 0.020 to 0.50, and the mole ratio $(O^{2-}/P^{5+})$ of the content of $O^{2-}$ to the content of $P^{5+}$ is 3.5 or higher.

According to an aspect of the embodiment of the present invention, the optical glass comprises $P^{5+}$ as a cationic component and $O^{2-}$ and $F^-$ as anionic components, wherein the content of $F^-$ is 40 anionic 1 or less, the abrasion factor $F_A$ is 420 or higher, and the optical glass has no crystallization peak temperature Tc, or has a crystallization peak temperature Tc, and the difference (Tc–Tg) between the crystallization peak temperature Tc and the glass transition temperature Tg is 80° C. or more.

Note that any combinations of the above-described embodiments are also included in embodiments of the present invention.

The invention claimed is:

1. An optical glass comprising $P^{5+}$, $Al^{3+}$, alkali metal ions, and alkaline earth metal ions as cationic components and $O^{2-}$ and $F^-$ as anionic components, wherein
   a content of $P^{5+}$ is 20 to 45 cationic %,
   a content of $Al^{3+}$ is 16 to 30 cationic %,
   a total content of $R^+$ of the alkali metal ions exceeds 0 cationic % and is 12 cationic % or less,
   a total content of $R^{2+}$ of the alkaline earth metal ions is 20 cationic % or more,
   a content of $Rb^+$ is 0 to 3 cationic %,
   a content of $Cs^+$ is 0 to 3 cationic %,
   a content of $Zn^{2+}$ is 0 to 3 cationic %,
   a content of $F^-$ of 40 anionic % or less,
   a mole ratio $(R^+/P^{5+})$ of the total content $R^+$ of the alkali metal ions to the content of $P^{5+}$ is 0.070 to 0.50, and
   the optical glass has an abrasion factor FA of 420 or higher, a fragility index value B of 4000 $\mu m^{-1/2}$ or lower, and an Abbe number vd of 70 or lower.

2. The optical glass according to claim 1, wherein
   the content of $F^-$ is 18 to 40 anionic %, and
   a content of $O^{2-}$ is 60 to 82 anionic %.

3. The optical glass according to claim 1, wherein a mole ratio $(O^{2-}/P^{5+})$ of a content of $O^{2-}$ to the content of $P^{5+}$ is 3.5 or higher.

4. The optical glass according to claim 1, wherein a mole ratio $(Li^+/R^+)$ of a content of $Li^+$ to the total content $R^+$ of the alkali metal ions exceeds 0.

5. The optical glass according to claim 1, wherein a mole ratio $(R^{2+}/P^{5+})$ of the total content $R^{2+}$ of the alkaline earth metal ions to the content of $P^{5+}$ is 0.7 to 1.4.

6. The optical glass according to claim 1, wherein the optical glass has a glass transition temperature of 580° C. or lower.

7. The optical glass according to claim 1, wherein
   the optical glass does not have a crystallization peak temperature Tc, or
   the optical glass has a crystallization peak temperature Tc, and the difference (Tc–Tg) between the crystallization peak temperature Tc and a glass transition temperature Tg is 80° C. or more.

8. The optical glass according to claim 1, wherein the optical glass has a liquidus temperature of 850° C. or lower.

9. The optical glass according to claim 1, wherein the optical glass has a deviation ΔPg,F of a partial dispersion ratio Pg,F of 0.0158 or more.

10. The optical glass according to claim 1, wherein the optical glass is to be subjected to a polishing process.

11. A glass material for press molding, comprising the optical glass according to claim 1.

12. An optical element blank comprising the optical glass according to claim 1.

13. An optical element comprising the optical glass according to claim 1.

14. A method for producing a glass material for press molding, comprising a step of processing a molded glass article comprising the optical glass according to claim 1.

15. A method for producing an optical element, comprising a step of processing a molded glass article comprising the optical glass according to claim 1.

16. An optical glass comprising:
   $P^{5+}$, $Al^{3+}$, alkali metal ions, and alkaline earth metal ions as cationic components; and
   $O^{2-}$ and $F^-$ as anionic components, wherein
   a content of $P^{5+}$ is 20 to 45 cationic %,
   a content of $Al^{3+}$ is 16 to 30 cationic %,
   a total content $R^+$ of the alkali metal ions exceeds 0 cationic % and is 12 cationic % or less,
   a total content $R^{2+}$ of the alkaline earth metal ions is 20 cationic % or more,
   a content of $Rb^+$ is 0 to 3 cationic %,
   a content of $Cs^+$ is 0 to 3 cationic %,
   a content of $Zn^{2+}$ is 0 to 3 cationic %,
   a content of $F^-$ is 18 to 40 anionic %,
   a content of $O^{2-}$ is 60 to 82 anionic %,
   a mole ratio $(R^+/P^{5+})$ of the total content $R^+$ of the alkali metal ions to the content of $P^{5+}$ is 0.070 to 0.50,
   a mole ratio $(O^{2-}/P^{5+})$ of the content of $O^{2-}$ to the content of $P^{5+}$ is 3.5 or higher, and
   the optical glass has an Abbe number vd of 70 or lower.

* * * * *